United States Patent
Nakayama (10) Patent No.: US 7,903,146 B2
(45) Date of Patent: Mar. 8, 2011

(54) IMAGE CAPTURING APPARATUS WITH IMAGE SIGNAL AND OBJECT LUMINANCE DETECTION FOR EXPOSURE CONTROL

(75) Inventor: Satoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 11/943,174

(22) Filed: Nov. 20, 2007

(65) Prior Publication Data
US 2008/0151086 A1 Jun. 26, 2008

(30) Foreign Application Priority Data
Dec. 20, 2006 (JP) .................. 2006-343497

(51) Int. Cl.
*H04N 5/235* (2006.01)
(52) U.S. Cl. .................... 348/221.1; 348/227.1
(58) Field of Classification Search .......... 348/362, 348/236, 366, 370, 234, 222.1, 364
See application file for complete search history.

(56) References Cited

U.S. PATENT DOCUMENTS

| 2005/0007487 A1* | 1/2005 | Miyoshi et al. ............... 348/362 |
| 2006/0256207 A1* | 11/2006 | Kokubo et al. ............ 348/223.1 |
| 2010/0177214 A1* | 7/2010 | Ozaki et al. ................... 348/234 |
| 2010/0214439 A1* | 8/2010 | Oshima et al. ............. 348/229.1 |

FOREIGN PATENT DOCUMENTS

| JP | 05-049151 | 7/1993 |
| JP | 2001-036806 | 2/2001 |

* cited by examiner

*Primary Examiner* — Jason Chan
*Assistant Examiner* — Gary C Vieaux
(74) *Attorney, Agent, or Firm* — Cowan, Liebowitz & Latman, P.C.

(57) ABSTRACT

This invention improves the response characteristic of exposure control while keeping the exposure control precision high in an image capturing apparatus. An image capturing apparatus includes an image sensor which photo-electrically converts an object image to output an image signal, an output interval control unit which controls the output interval of the image signal from the image sensor, a first detection unit which detects object luminance information from the image signal, a second detection unit which detects the object luminance information by directly receiving light from an object, and a control unit which controls the exposure of the image sensor by selectively using a detection signal from the first detection unit and a detection signal from the second detection unit based on the output interval of the image signal controlled by the output interval control unit.

14 Claims, 5 Drawing Sheets

IMAGE CAPTURING APPARATUS WITH IMAGE SIGNAL AND OBJECT LUMINANCE DETECTION FOR EXPOSURE CONTROL

BACKGROUND OF THE INVENTION

1. Field of the Invention

The present invention relates to an exposure control technique in an image capturing apparatus.

2. Description of the Related Art

Conventionally, image capturing apparatuses such as an electronic camera and video camcorder generally perform exposure control by controlling exposure parameters such as the aperture value, shutter speed, and image gain based on the luminance level of a captured image. This method can determine the luminance level for an actually captured image. Thus, this method can advantageously increase the exposure control precision, change the weight depending on the image area, and perform accurate partial photometry.

As another photometric method, a camera using a silver halide film, a single-lens reflex type camera, and the like comprise an independent photometric sensor, and determine the exposure in accordance with an output from the photometric sensor.

To utilize the advantages of these two photometric methods, Japanese Patent Publication No. 5-49151 proposes a photometric method using the arrangements of the two methods. According to Japanese Patent Publication No. 5-49151, light is metered by an external photometric apparatus to determine an aperture value which provides a correct exposure amount. The electronic shutter executes exposure for an exposure time by which a correct exposure amount is attained on the assumption that the determined aperture value is proper. The exposure amount at that time is detected, and a correct exposure time is determined in consideration of the photometric error of the external photometric apparatus, the aperture error, and the error of the correct exposure amount. Then, exposure for shooting is done without changing the aperture value. Hence, high-precision exposure control can be achieved within a short time without correcting the exposure time again and again.

Japanese Patent Laid-Open No. 2001-36806 makes a similar proposal in order to complete pre-exposure within a time as short as possible in shooting a still image. According to Japanese Patent Laid-Open No. 2001-36806, when the first shutter speed obtained based on an external photometric value is lower than a reference value, the second shutter speed higher than the first one is set, and pre-exposure is done using the second shutter speed. This can shorten the time taken to execute pre-exposure, and decrease the time lag until the start of actual exposure.

However, the conventional image capturing apparatus suffers the following problems.

In the arrangement in which exposure control is performed based on the luminance level of a captured image, no problem arises when the shutter speed is sufficiently high and the output period of an image capturing signal is short. However, in shooting at slow shutter speed for a long charge storage time, the output period of an image capturing signal becomes long, the exposure detection period based on the luminance level also becomes long, and the response characteristic of exposure control becomes poor. That is, when the luminance greatly changes, a long time is taken until the exposure of an image is stabilized. In shooting a moving image, the exposure may not be stabilized depending on the output period of an image capturing signal, and overexposure and underexposure may be repeated.

In the arrangement in which an independent photometric sensor is adopted to determine the exposure in accordance with an output from the photometric sensor, the luminance level cannot be determined for an actually shot image, and the exposure control precision may decrease. It is difficult to change the weight depending on the image area and perform accurate partial photometry. Particularly when the zoom lens is used, the photometric range changes depending on the focal length.

According to the photometric method using these two arrangements, the conventionally proposed arrangement is effective for only still images, but is not effective in shooting moving images.

SUMMARY OF THE INVENTION

The present invention has been made to overcome the conventional drawbacks, and has as its object to improve the response characteristic of exposure control while keeping the exposure control precision high in an image capturing apparatus.

To solve the above-described problems and achieve the object, according to the first aspect of the present invention, an image capturing apparatus comprises an image capturing unit which photo-electrically converts an object image to output an image signal, an output interval control unit which controls an output interval of the image signal from the image capturing unit, a first detection unit which detects object luminance information from the image signal, a second detection unit which detects the object luminance information by directly receiving light from an object, and a control unit which controls exposure of the image capturing unit by selectively using a detection signal from the first detection unit and a detection signal from the second detection unit based on the output interval of the image signal controlled by the output interval control unit.

According to the second aspect of the present invention, a method of controlling an image capturing apparatus having an image capturing unit which photo-electrically converts an object image to output an image signal comprises an output interval control step of controlling an output interval of the image signal from the image capturing unit, a first detection step of detecting object luminance information from the image signal, a second detection step of detecting the object luminance information by directly receiving light from an object, and a control step of controlling exposure of the image capturing unit by selectively using a detection signal in the first detection step and a detection signal in the second detection step based on the output interval of the image signal controlled in the output interval control step.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings.

First Embodiment

Figure 1:
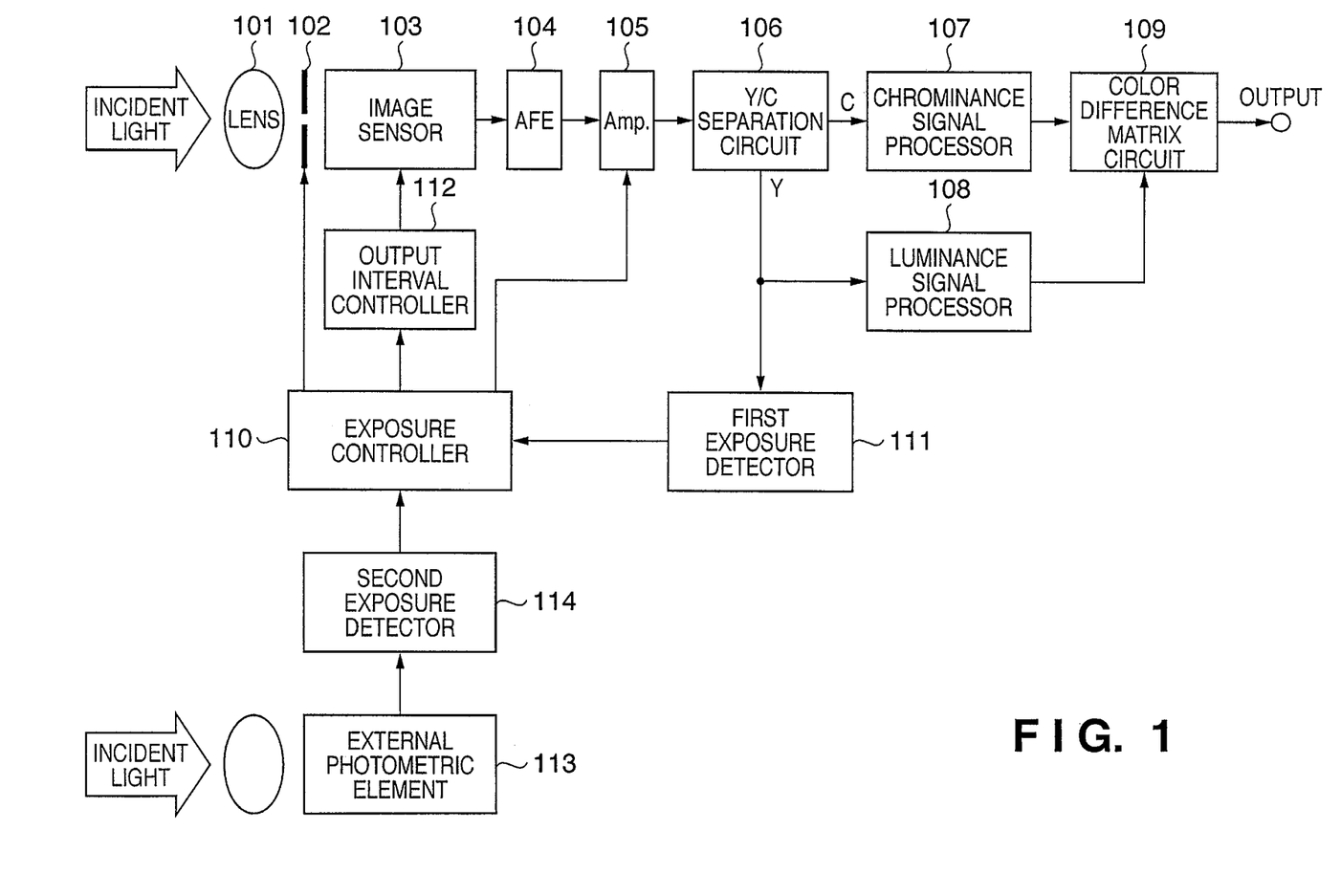
FIG. 1 is a block diagram showing the configuration of the image capturing system of an electronic camera according to the first embodiment of the present invention.

FIG. 1 is a block diagram showing the configuration of the image capturing system of an electronic camera according to the first embodiment of the present invention.

In FIG. 1, a lens 101 forms an object image. A diaphragm 102 adjusts the exposure amount. An image sensor 103 photo-electrically converts an object image to output an image signal. An analog front end (AFE) 104 samples and A/D-converts an output from the image sensor. A gain amplifier 105 changes the gain. A Y/C separation circuit 106 separates an image signal into a luminance component and chrominance components. The image capturing system also comprises a chrominance signal processor 107 and luminance signal processor 108. A color difference matrix circuit 109 generates color difference signals from a luminance signal and chrominance signals. An exposure controller 110 controls exposure control parameters such as the shutter speed, aperture value, and gain. A first exposure detector 111 detects the luminance (exposure state) of an object from an image capturing signal. An output interval controller 112 controls the charge storage period of the image sensor 103 and changes the shutter speed. An external photometric element 113 detects the luminance of an object by directly receiving light from the object. A second exposure detector 114 determines the exposure from an output from the external photometric element 113.

Light entering the lens 101 is adjusted into a proper light quantity by the diaphragm 102, and photo-electrically converted by the image sensor 103. An image signal obtained by photo-electric conversion by the image sensor 103 is sampled and A/D-converted by the analog front end 104, converted into a proper level by the gain amplifier 105, and separated into a luminance signal and chrominance signals by the Y/C separation circuit 106. The chrominance signals separated by the Y/C separation circuit 106 undergo signal processing of the color system such as white balance control by the chrominance signal processor 107, and is input to the color difference matrix circuit 109.

The luminance signal separated by the Y/C separation circuit 106 undergoes processing such as edge enhancement and γ processing by the luminance signal processor 108, and is input to the color difference matrix circuit 109. The processed signals are output as color difference signals and a luminance signal.

Although not shown in FIG. 1, the chrominance signal processor 107 includes a white balance circuit, color gamma circuit, and hue/chroma correction circuit. The color gamma circuit gamma-converts chrominance signals having undergone white balance control by the white balance circuit in accordance with an object. After the hue/chroma correction circuit corrects the hue, chroma, and the like, the chrominance signals are output.

The luminance signal processor 108 includes a luminance signal processing circuit, edge enhancement circuit, and luminance gamma circuit. The luminance signal processing circuit performs predetermined processing for a luminance signal. After the edge enhancement circuit adds an edge enhancement signal, the luminance signal is output.

An image signal generated by the color difference matrix circuit 109 is output to a recording medium and external terminal, and at the same time to a monitoring display or the like.

The exposure controller 110 automatically performs exposure control by changing the shutter speed, aperture value, and gain. The shutter speed is controlled by electrically changing the storage time of the image sensor 103 in moving image shooting. In still image shooting, the stop 102 also functions as a shutter for adjusting the exposure time. The exposure time is determined by closing the stop 102 after the image sensor starts storing charges. The video level is controlled by changing the gain of the gain amplifier 105 in accordance with the shooting state.

The output interval controller 112 controls the storage period of charges stored in the image sensor 103 based on information from the exposure controller 110. For example, a device which shoots an NTSC video signal generally stores charges every 1/60 sec and outputs a field image signal. Thus, an image signal output from the image capturing apparatus corresponds to 60 fields per second. When charges are stored for a longer time, they are stored for 1/30 sec, and a field or frame image signal is output at an interval of 1/30 sec. At this time, the AFE 104 and subsequent units also execute signal processes at the interval of 1/30 sec. An image signal output from the image capturing apparatus has 30 frames per second, and the frame rate decreases.

The first exposure detector 111 detects a luminance level from a luminance signal separated by the Y/C separation circuit 106, and outputs the exposure amount. The luminance level can be detected by center-weighted average metering of weighting the center of an image, spot metering of detecting only part of an image, or evaluation metering of dividing an image into a plurality of parts and evaluating the whole image from the position and luminance. That is, there are proposed a variety of arrangements capable of achieving optimum photometry in accordance with the object type and illumination state. These methods have an advantage capable of detecting an exposure state from an image. Also, these methods exhibit a very high exposure control precision because an actual image signal can be evaluated and fed back to exposure control. However, these methods are disadvantageous when the electronic camera operates at a frame rate of 30 frames/sec, as described above, because the image update period becomes 1/2 of the normal one and the response characteristic of exposure control also becomes 1/2.

The external photometric element 113 is arranged outside the image capturing lens, and can directly meter the illuminance of an object. A signal output from the external photometric element 113 is processed as exposure information by the second exposure detector 114, and output. In the first embodiment, the precision of exposure control by the second exposure detector 114 is lower than that of exposure control by the first exposure detector. However, the precision of exposure control by the second exposure detector 114 need not always be lower. The external photometric element 113 and second exposure detector 114 operate independently of the image sensor 103, and can operate at an interval shorter than the image output period of the image sensor 103.

The exposure controller 110 receives two exposure control signals from the first exposure detector 111 and second exposure detector 114, and executes the above-mentioned exposure control based on these signals. How to use two exposure control signals from the first exposure detector 111 and second exposure detector 114 will be explained.

Figure 2:
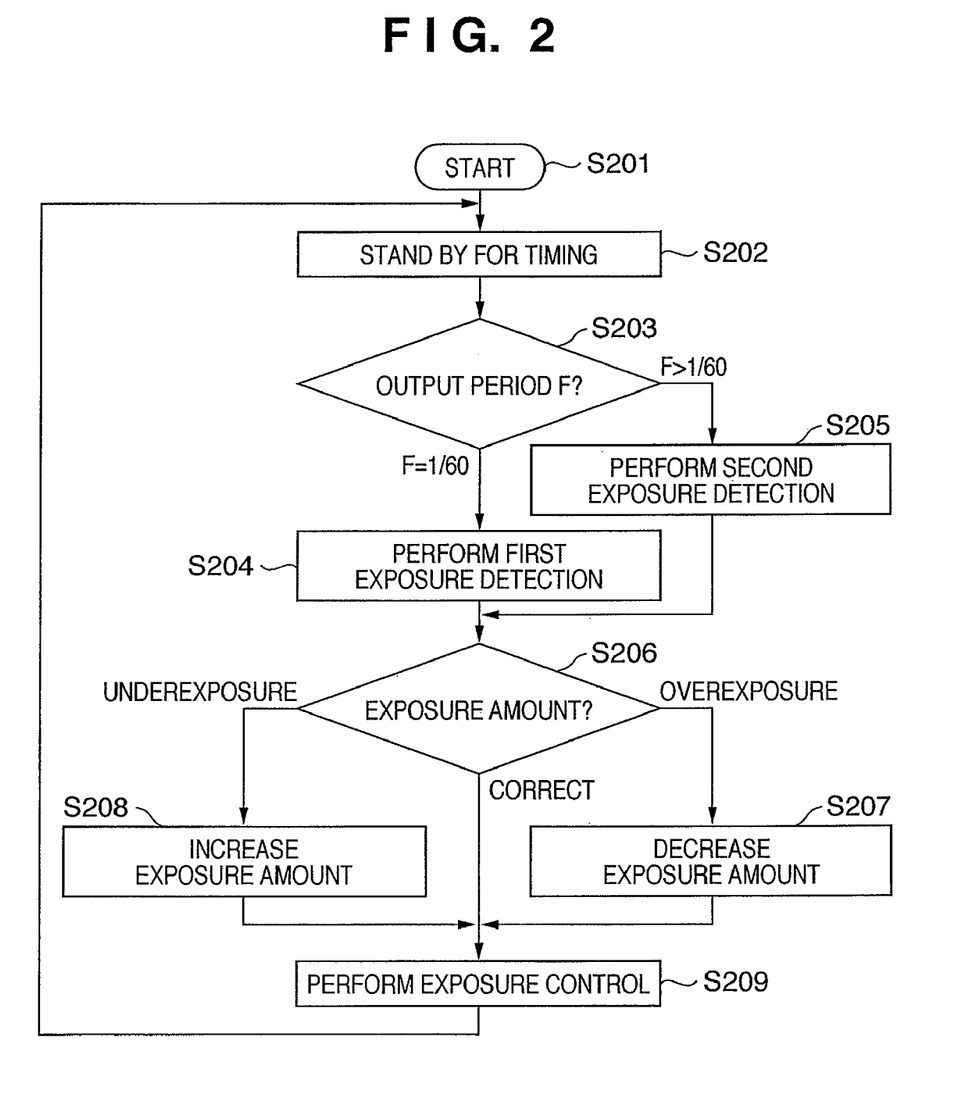
FIG. 2 is a flowchart showing the sequence of exposure control processing by the electronic camera according to the first embodiment in order to explain exposure control processing by an exposure controller in FIG. 1.

FIG. 2 is a flowchart showing the sequence of exposure control processing by the electronic camera according to the first embodiment in order to explain exposure control processing by the exposure controller 110 in FIG. 1.

In FIG. 2, step S201 is exposure control start processing, step S202 is exposure detection timing standby processing, step S203 is output period determination processing, step S204 is the first exposure detection processing, and step S205 is the second exposure detection processing. Step S206 is exposure amount determination processing, step S207 is exposure amount decrease control processing, step S208 is exposure amount increase control processing, and step S209 is exposure control processing.

Figure 3:
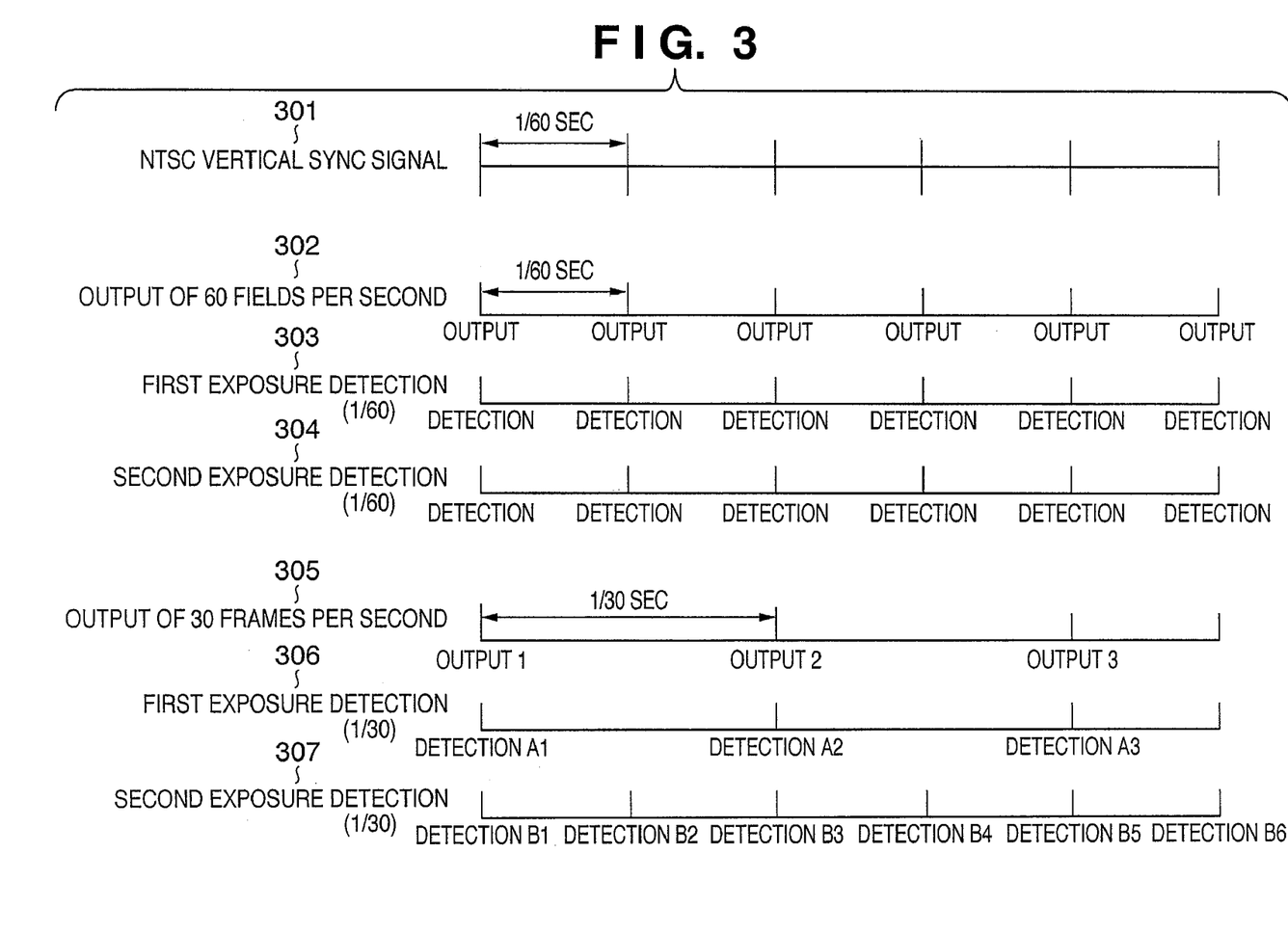
FIG. 3 is a timing chart showing the image capturing period of moving image shooting by the electronic camera according to the first embodiment.

FIG. 3 is a timing chart showing the image capturing period of moving image shooting by the electronic camera according to the first embodiment.

In FIG. 3, reference numeral 301 denotes a timing of the vertical sync signal of an NTSC signal, which represents that an image signal is updated in a period of $\frac{1}{60}$ sec. Reference numeral 302 denotes a timing when outputting 60 fields per second, which represents that charges are stored in the image sensor in a period of $\frac{1}{60}$ sec and an image signal is output in the same period. Reference numeral 303 denotes a detection period of the first exposure detection when outputting 60 fields per second. Reference numeral 304 denotes a detection period of the second exposure detection when outputting 60 fields per second. Reference numeral 305 denotes a timing when outputting 30 frames (or fields) per second, which represents that charges are stored in the image sensor in a period of $\frac{1}{30}$ sec and an image signal is output in the same period. Reference numeral 306 denotes a detection period of the first exposure detection when outputting 30 frames (or fields) per second. Reference numeral 307 denotes a detection period of the second exposure detection when outputting 30 frames (or fields) per second. In the following description, an operation to output 30 frames or 30 fields per second will be called output of 30 frames per second.

Exposure control processing when shooting an NTSC moving image will be explained with reference to the flowchart of FIG. 2.

When the electronic camera starts a shooting operation, the process starts from exposure control start processing (step S201). In timing standby processing (step S202), the process stands by for a vertical sync signal in order to perform exposure control at the interval of the vertical sync signal 301 of the NTSC signal.

When the signal output period is $\frac{1}{60}$ sec, a signal is output at the timing 302 in FIG. 3. In the first exposure detection of performing photometry based on an image, the exposure can be detected in synchronism with the vertical sync signal timing as represented by the detection period 303. Hence, the period of $\frac{1}{60}$ sec is set as the basic period of exposure control, and the response characteristic of exposure control is also optimized in accordance with this period.

In output period determination processing (step S203), it is determined whether the signal output period is equal to or longer than $\frac{1}{60}$ sec. If the signal output period is $\frac{1}{60}$ sec, as described above, this period is the basic period of exposure control, and the response characteristic of exposure control is proper. At this time, the second exposure detection 304 is also performed in the same period. However, the detection precision of the first exposure detection is higher, and it is therefore optimum to perform exposure control using the detection result of the first exposure detection. Thus, the process proceeds to the first exposure detection processing (step S204). If the detection precision of the second exposure detection is higher, the detection result of the second exposure detection is applied.

When the signal output period is $\frac{1}{30}$ sec, a signal is output at the timing 305 in FIG. 3. In the first exposure detection of performing photometry based on an image, the exposure is detected in only the detection period 306 of $\frac{1}{30}$ sec. In the above-described arrangement in which the basic period of exposure control is set to $\frac{1}{60}$ sec, the response characteristic of exposure control becomes poor in exposure detection every $\frac{1}{30}$ sec. In the second exposure detection, even when the signal output period is $\frac{1}{30}$ sec, the exposure is detected in the period of $\frac{1}{60}$ sec regardless of the signal output period, and this period coincides with the basic period of exposure control. The first embodiment can optimize the response characteristic of exposure control by executing exposure control using the detection signal of not the first exposure detection but the second exposure detection when, for example, the signal output period is $\frac{1}{30}$ sec. Thus, if it is determined in output period determination processing (in step S203) that when the signal output period is longer than $\frac{1}{60}$ sec, the process proceeds to the second exposure detection processing (step S205).

In exposure amount determination processing (step S206), the type of exposure control to be performed is determined in accordance with the exposure state detected by the first exposure detection processing (step S204) or the second exposure detection processing (step S205). In exposure amount determination processing (step S206), the reference exposure level is compared with the detected exposure state. If the detected exposure state is higher than the reference exposure level, it is determined that the exposure state is overexposure, and the exposure is decreased in exposure amount decrease control processing (step S207). If it is determined in exposure amount determination processing (step S206) that the detected exposure state is lower than the reference exposure level, it is determined that the exposure state is underexposure, and the exposure is increased in exposure amount increase control processing (step S208). If it is determined in exposure amount determination processing (step S206) that the detected exposure state is equal to the reference exposure level, the process directly proceeds to exposure control processing (step S209).

After the exposure control target is set in exposure amount decrease control processing (step S207) or exposure amount increase control processing (step S208), exposure control processing (step S209) is executed. In exposure control processing (step S209), exposure control is performed in accordance with the set exposure control target using the shutter speed, aperture value, gain, and the like.

The exposure control processing according to the first embodiment has been described. According to this processing, when the signal output period of the image capturing apparatus is $\frac{1}{60}$ sec, the exposure can be detected at high precision in synchronism with the timing of the vertical sync signal using an output obtained by the first exposure detection of performing photometry based on an image. In this case, the response characteristic of exposure control is optimized. When the signal output period of the image capturing apparatus is longer than $\frac{1}{60}$ sec, the exposure can be detected in synchronism with the timing of the vertical sync signal using an output obtained by the second exposure detection using an external photometric element. Accordingly, exposure control can be performed with the same optimum response characteristic as that in a case where the signal output period of the image capturing apparatus is $\frac{1}{60}$ sec.

In the prior art, the response characteristic of exposure control becomes poor when the signal output period of the image capturing apparatus is longer than 1/60 sec. To the contrary, the first embodiment can implement exposure control with an optimum response characteristic regardless of the signal output period.

The first embodiment has exemplified an NTSC video image capturing apparatus using the period of 1/60 sec as a reference. However, this is merely an example, and the same effect can also be obtained for video signals at different frame rates/field rates regardless of interlaced/progressive. The same effect can also be attained for preview shooting before recording in a still image capturing apparatus.

When the signal output period is longer than 1/60 sec, the above-described arrangement adopts an output obtained by the second exposure detection using the external photometric element. However, higher-precision exposure control can be achieved using both an output obtained by the second exposure detection, and an output obtained by the first exposure detection of performing photometry based on an image.

The external photometric element is arranged outside the image capturing optical system, but may also be arranged midway along the image capturing optical system. It is also possible to use, as the external photometric element, part of an image sensor that is not used to shoot an object image, read out the signal of the external photometric element at a timing different from that of an image capturing signal, and use the readout signal for exposure detection.

Second Embodiment

Figure 4:
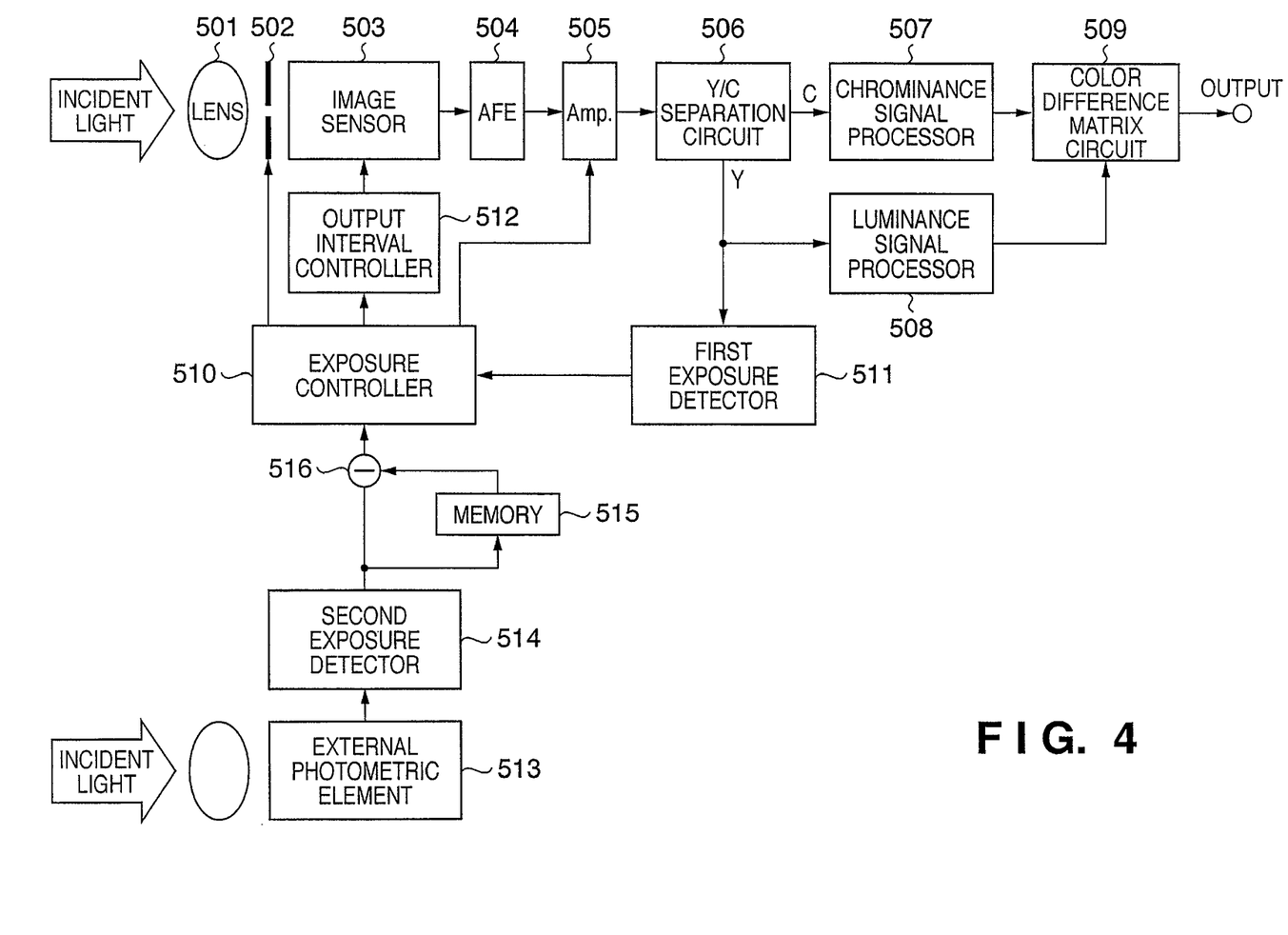
FIG. 4 is a block diagram showing the configuration of the image capturing system of an electronic camera according to the second embodiment of the present invention.

FIG. 4 is a block diagram showing the configuration of the image capturing system of an electronic camera according to the second embodiment of the present invention.

In FIG. 4, reference numerals 501 to 514 denote the same parts as those denoted by reference numerals 101 to 114 in FIG. 1 according to the first embodiment. A memory 515 stores a detection signal from the second exposure detector 514. A subtracter 516 subtracts, from a detection signal, a previous detection signal stored in the memory 515. Letting EV(n) be a detection signal detected by the second exposure detector 514, and EV(n−1) be a previous detection signal, an output ΔEV from the subtracter 516 is given by $$\Delta EV = EV(n) - EV(n-1) \quad (1)$$

This detection signal represents the luminance of an object, and is processed as an EV value. The EV value represents the exposure factor, and a change of +1 EV corresponds to a double exposure amount. The exposure controller 510 receives and internally processes ΔEV.

Figure 5:
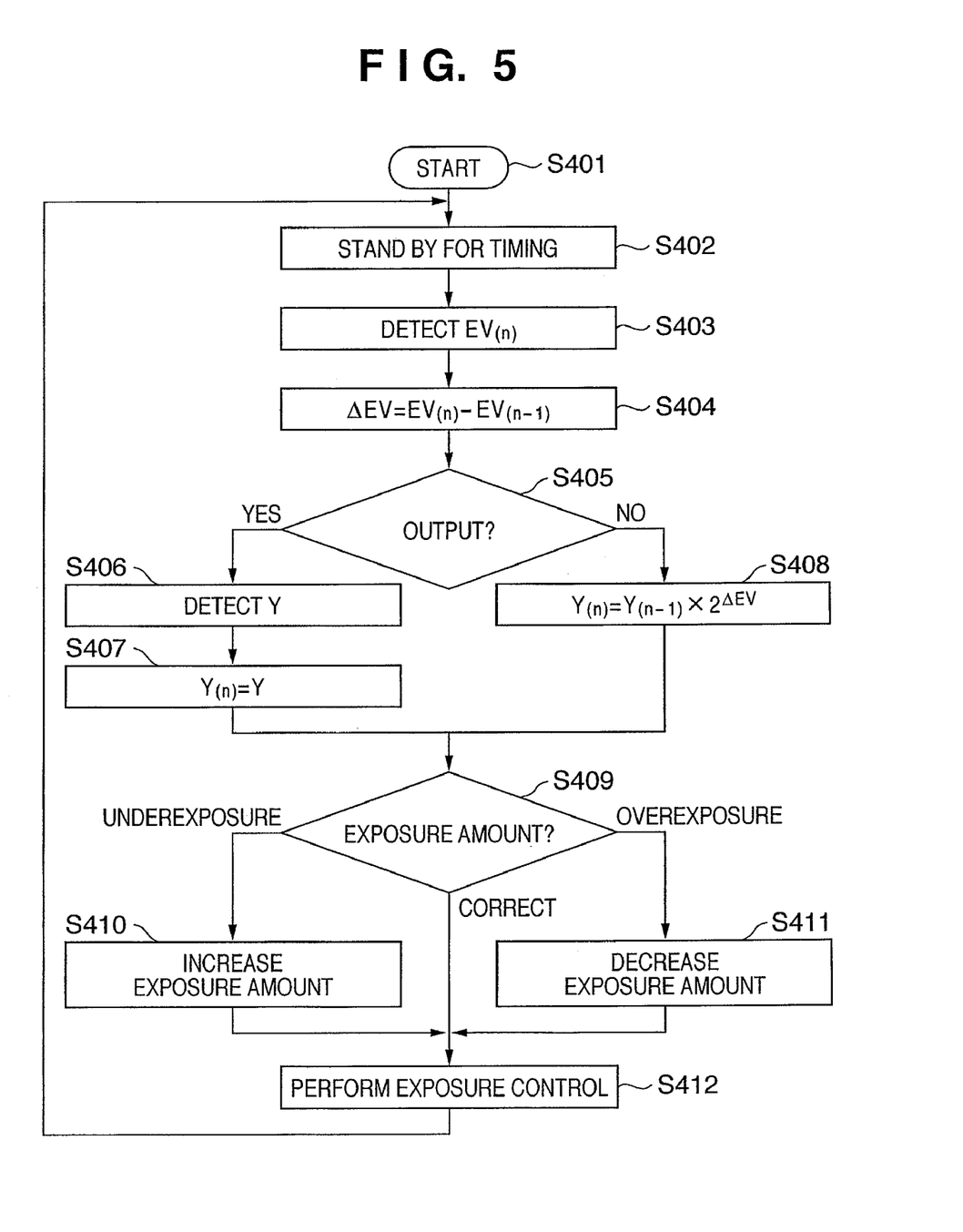
FIG. 5 is a flowchart showing the sequence of exposure control processing by an electronic camera according to the second embodiment in order to explain exposure control processing by an exposure controller in FIG. 4.

FIG. 5 is a flowchart showing the sequence of exposure control processing by an electronic camera according to the second embodiment in order to explain exposure control processing by the exposure controller 510 in FIG. 4.

In FIG. 5, step S401 is exposure control start processing, step S402 is exposure detection timing standby processing, and step S403 is the second exposure detection processing. Step S404 is difference signal calculation processing of calculating the difference signal ΔEV from a detection signal detected by the second exposure detection processing and a previous detection signal. Step S405 is output period determination processing, and step S406 is the first exposure detection processing. Step S407 is the first evaluation luminance signal generation processing of setting a detection signal Y detected by the first exposure detection processing (step S406) as an evaluation luminance signal Y(n). Step S408 is the second evaluation luminance signal generation processing of performing calculation to correct, by the difference signal ΔEV, a luminance signal previously detected by the first exposure detection processing (step S406). Step S409 is exposure amount determination processing, step S410 is exposure amount increase control processing, step S411 is exposure amount decrease control processing, and step S412 is exposure control processing. The detection signal Y detected by the first exposure detection processing (step S406) is a numerical value representing the luminance level of an image.

Exposure control processing when shooting an NTSC moving image will be explained with reference to the flowchart of FIG. 5.

When the electronic camera starts a shooting operation, the process starts from exposure control start processing (step S401).

In timing standby processing (step S402), the process stands by for a vertical sync signal in order to perform exposure control at the interval of a vertical sync signal 301 of the NTSC signal. The NTSC vertical sync signal has a period of 1/60 sec, and the process is done every 1/60 sec in the sequence loop of the second embodiment.

In the second exposure detection processing (step S403), the second exposure detector 514 in FIG. 4 detects the light quantity EV(n) of an object.

In difference signal calculation processing (step S404), an object light quantity EV(n−1) detected in a previous process loop is subtracted from the object light quantity EV(n) detected by the second exposure detector 514, and the difference is defined as ΔEV. The process up to this step is executed every 1/60 sec which is the process period of this sequence.

In the second embodiment, the period of 1/60 sec is set as the basic period of exposure control, and the response characteristic of exposure control is also optimized in accordance with this period. As described above, the sequence loop of the second embodiment is executed every 1/60 sec. In output period determination processing (step S405), it is determined whether a signal is output at the process execution timing of this sequence in which the process is done periodically.

When the signal output period is 1/60 sec, a signal is output at a timing 302 in FIG. 3. In the first exposure detection of performing photometry based on an image, the exposure can be detected in synchronism with the vertical sync signal timing as represented by a detection period 303. Thus, when the signal output period is 1/60 sec, it is always determined in output period determination processing (step S405) that a signal is output. The process always proceeds to the first exposure detection processing (step S406). If the signal output period is 1/60 sec, as described above, this period is the basic period of exposure control, and the response characteristic of exposure control is proper. At this time, second exposure detection 304 is also performed in the same period. However, the detection precision of the first exposure detection is higher, and it is optimum and sufficient to perform exposure control using the detection result of the first exposure detection. At this time, ΔEV calculated in difference signal calculation processing (step S404) is not used.

In the first evaluation luminance signal generation processing (step S407), an exposure evaluation luminance level Y(n) is generated from the image luminance level Y detected by the first exposure detection processing (step S406), and is used in exposure amount determination processing (step S409).

When the signal output period is 1/30 sec, a signal is output at a timing 305 in FIG. 3. In the first exposure detection of performing photometry based on an image, the exposure is detected in only a detection period 306 of 1/30 sec. In the above-described arrangement in which the basic period of exposure control is set to 1/60 sec, the response characteristic of exposure control becomes poor in exposure detection every 1/30 sec. When the signal output period is 1/30 sec, no output is obtained in the first exposure detection processing (step S406) during, for example, the period between output 1 and output 2 in the output 305 of 30 frames per second in FIG. 3, that is, between detection A1 and detection A2 in the first exposure detection (1/30) 306. That is, only detection B2 in second exposure detection (1/30) 307 is output in the second exposure detection processing (step S403). In this case, it is determined in output period determination processing (step S405) that no signal is output, and the process proceeds to the second evaluation luminance signal generation processing (step S408).

In the second evaluation luminance signal generation processing (step S408), Y(n−1) obtained during a previous loop process is corrected using ΔEV calculated in difference signal calculation processing (step S404), generating an exposure evaluation luminance level Y(n). This correction is given by $$Y(n)=Y(n-1)\times 2^{\Delta EV} \qquad (2)$$

Since a change of +1 EV corresponds to a double exposure amount, this calculation converts a change of the exposure amount into the change amount of the luminance level of an image. The calculated luminance level Y(n) is an accurate luminance level at that time even during exposure of the image sensor. Since a detection signal by the second exposure detection processing (step S403) is obtained in the period of 1/60 sec, the exposure evaluation luminance level Y(n) is also obtained in the period of 1/60 sec. The calculated luminance level Y(n) is used in exposure amount determination processing (step S409).

In exposure amount determination processing (step S409), the type of exposure control to be performed is determined in accordance with the luminance level Y(n) obtained by the above-mentioned two systems. In exposure amount determination processing (step S409), the reference exposure level is compared with the detected exposure state. If the detected exposure state is higher than the reference exposure level, it is determined that the exposure state is overexposure, and the exposure is decreased in exposure amount decrease control processing (step S411). If it is determined in exposure amount determination processing (step S409) that the detected exposure state is lower than the reference exposure level, it is determined that the exposure state is underexposure, and the exposure is increased in exposure amount increase control processing (step S410). If it is determined in exposure amount determination processing (step S409) that the detected exposure state is equal to the reference exposure level, the process directly proceeds to exposure control processing (step S412).

After the exposure control target is set in exposure amount decrease control processing (step S411) or exposure amount increase control processing (step S410), exposure control processing (step S412) is executed. In exposure control processing (step S412), exposure control is performed in accordance with the set exposure control target using the shutter speed, aperture value, gain, and the like.

The exposure control processing according to the second embodiment has been described. According to this processing, when the signal output period of the image capturing apparatus is 1/60 sec, the exposure can be detected at high precision in synchronism with the timing of the vertical sync signal using an output obtained by the first exposure detection of performing photometry based on an image. In this case, the response characteristic of exposure control is optimized. When the signal output period of the image capturing apparatus is longer than 1/60 sec, the exposure can be detected in synchronism with the timing of the vertical sync signal by correcting a detection signal using an output obtained by the second exposure detection using an external photometric element. Exposure control can be performed with the same optimum response characteristic as that in a case where the signal output period of the image capturing apparatus is 1/60 sec. Since the luminance level Y(n) calculated at this time is generated from an output obtained by the first exposure detection of performing photometry based on an image, this can compensate for low detection precision which is a disadvantage of the second exposure detection using an external photometric element. As a result, high-precision exposure control can be done even when the signal output period of the image capturing apparatus is longer than 1/60 sec.

Exposure control using the shutter speed, aperture value, gain, and the like in exposure control processing (step S412) when the signal output period of the image capturing apparatus is longer than 1/60 sec may be performed during exposure of the image sensor 503 or immediately before the next exposure. However, if exposure control is done during exposure of the image sensor 503, the response characteristic can be further improved.

As another advantage of the arrangement according to the second embodiment, the detection precision is not influenced by even variations between devices in the absolute value of EV(n) caused by individual variations between external photometric elements because the detection signal in the second exposure detection processing (step S403) is used only as the change amount. Hence, this arrangement does not require adjustment which is generally necessary when an external photometric element is adopted, in order to absorb individual variations.

In the prior art, the response characteristic of exposure control becomes poor when the signal output period of the image capturing apparatus is longer than 1/60 sec. In contrast, the second embodiment can implement high-precision exposure control while keeping the response characteristic optimum regardless of the signal output period.

The second embodiment has exemplified an NTSC video image capturing apparatus using the period of 1/60 sec as a reference. However, this is merely an example, and the same effect can also be obtained for video signals at different frame rates/field rates regardless of interlaced/progressive. The same effect can also be attained for preview shooting before recording in a still image capturing apparatus.

In the above-described arrangement, an output obtained by the second exposure detection using an external photometric element is an EV value. However, any signal form is available as long as it represents the object light quantity. The luminance level Y(n) may also be calculated by a method different from equation (2). Further, the luminance level Y(n) is calculated using the difference signal ΔEV in the above-described arrangement, but may also be calculated using not the difference but the ratio.

The external photometric element is arranged outside the image capturing optical system, but may also be arranged midway along the image capturing optical system. It is also possible to use, as the external photometric element, part of an image sensor that is not used to shoot an object image, read out the signal of the external photometric element at a timing different from that of an image capturing signal, and use the readout signal for exposure detection.

Third Embodiment

In the first and second embodiments, a signal output from an external photometric element is referred to only when the signal output period of an image capturing apparatus is longer than 1/60 sec. However, if the illuminance of an object abruptly changes even when the signal output period is 1/60 sec in a conventional NTSC image capturing apparatus, it is sometimes difficult to detect an exposure state from a captured image signal. For example, when the illuminance of an object abruptly rises during the period of 1/60 sec, and an image capturing signal output exceeds the dynamic range of the image sensor and is saturated, so-called highlight saturation occurs. In this case, generation of overexposure can be determined in exposure detection of performing photometry based on an image. However, the degree of exposure cannot be obtained from an image. If no exposure control amount can be determined accurately, excessive correction may be performed to generate overshoot or undershoot or a long time may be taken until the exposure converges to a correct exposure. Also, the exposure may not be able to converge to a correct exposure, causing so-called hunting. In this case, if the dynamic range of an external photometric element is wider than that of an image sensor, the change amount of the object light quantity can be accurately determined.

According to the third embodiment of the present invention, when the luminance level of an image capturing signal becomes high regardless of the signal output period or it is determined that the image capturing signal is saturated, exposure detection information based on an image is corrected or complemented by referring to an exposure signal from an external photometric element. According to this arrangement, the exposure amount can always be determined even upon an abrupt object illuminance change enough to saturate an image capturing signal.

As described above, according to the prior art, when the object illuminance abruptly changes, overshoot or undershoot may occur in exposure control, and a long time may be taken until the exposure converges to a correct exposure. Also, the exposure may not be able to converge to a correct exposure, causing so-called hunting. To the contrary, according to the method of the third embodiment, even if the object illuminance abruptly changes to saturate an image capturing signal, the exposure amount can always be determined.

At low shutter speed, the dynamic range of an external photometric element is set to be wide on the low-illuminance side. At high shutter speed, the dynamic range of an external photometric element is set to be wide on the high-illuminance side. This setting can implement shooting hardly influenced by an illuminance change.

The third embodiment has exemplified an NTSC video image capturing apparatus using the period of 1/60 sec as a reference. However, this is merely an example, and the same effect can also be obtained for video signals at different frame rates/field rates regardless of interlaced/progressive. The same effect can also be attained for preview shooting before recording in a still image capturing apparatus.

Other Embodiments

The object of each embodiment is achieved even by the following method. That is, a storage medium (or recording medium) which stores software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. In addition to the case where the functions of the above-described embodiments are implemented when the computer executes the readout program codes, the present invention incorporates the following case. That is, the functions of the above-described embodiments are implemented when the operating system (OS) or the like running on the computer performs part or all of actual processing based on the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing based on the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-343497, filed Dec. 20, 2006, which is hereby incorporated by reference herein in its entirety.

What is claimed is:

1. An image capturing apparatus comprising:
   an image capturing unit which photo-electrically converts an object image to output an image signal;
   an output interval control unit which controls an output interval of the image signal from said image capturing unit;
   a first detection unit which detects object luminance information from the image signal;
   a second detection unit which detects the object luminance information by directly receiving light from an object; and
   a control unit which controls exposure of said image capturing unit by selectively using a detection signal from said first detection unit and a detection signal from said second detection unit based on the output interval of the image signal controlled by said output interval control unit.

2. The apparatus according to claim 1, wherein said control unit controls the exposure of said image capturing unit by using the detection signal from said first detection unit when the output interval of the image signal controlled by said output interval control unit is shorter than a predetermined interval.

3. The apparatus according to claim 1, wherein said control unit controls the exposure of said image capturing unit by using the detection signal from said second detection unit when the output interval of the image signal controlled by said output interval control unit is longer than a predetermined interval.

4. The apparatus according to claim 1, wherein said control unit controls the exposure of said image capturing unit by using both the detection signal from said first detection unit and the detection signal from said second detection unit when the output interval of the image signal controlled by said output interval control unit is longer than a predetermined interval.

5. The apparatus according to claim 1, wherein said second detection unit detects the object luminance information based on an output signal from part of said image capturing unit that is not used for image capturing within an image capturing area.

6. The apparatus according to claim 1, further comprising an optical system which forms an object image,
   wherein said second detection unit is arranged outside said optical system.

7. The apparatus according to claim 1, further comprising an optical system which forms an object image,
   wherein said second detection unit is arranged inside said optical system.

8. The apparatus according to claim 1, further comprising a diaphragm unit which adjusts a quantity of light entering said image capturing unit, a shutter control unit which controls a charge storage period of said image capturing unit, and a gain control unit which adjusts a gain of the image signal,
   wherein said control unit controls the exposure of said image capturing unit by controlling at least one of said diaphragm unit, said shutter control unit, and said gain control unit.

9. The apparatus according to claim 1, wherein said control unit causes said second detection unit to detect a second detection signal serving as object luminance information simultaneously when causing said first detection unit to detect a first detection signal serving as object luminance information from the image signal, said control unit further causes said second detection unit to detect a third detection signal serving as object luminance information before an output period of the image signal that is a next object luminance detection period of said first detection unit, and said control unit corrects the first detection signal by using a difference between the second detection signal and the third detection signal.

10. The apparatus according to claim 1, wherein a dynamic range of said second detection unit is wider than a dynamic range of said first detection unit.

11. The apparatus according to claim 10, wherein when a shutter speed set in the image capturing apparatus is higher than a predetermined speed, the dynamic range of said second detection unit is set to be wide on a high-illuminance side, as compared with the dynamic range of said first detection unit.

12. The apparatus according to claim 10, wherein when a shutter speed set in the image capturing apparatus is lower than a predetermined speed, the dynamic range of said second detection unit is set to be wide on a low-illuminance side, as compared with the dynamic range of said first detection unit.

13. A method of controlling an image capturing apparatus having an image capturing unit which photo-electrically converts an object image to output an image signal, the method comprising:
   an output interval control step of controlling an output interval of the image signal from the image capturing unit;
   a first detection step of detecting object luminance information from the image signal;
   a second detection step of detecting the object luminance information by directly receiving light from an object; and
   a control step of controlling exposure of the image capturing unit by selectively using a detection signal in the first detection step and a detection signal in the second detection step based on the output interval of the image signal controlled in the output interval control step.

14. A computer-readable storage medium which stores a program which causes a computer to execute a control method defined in claim 13.

* * * * *